US008768957B2

(12) United States Patent
Chan et al.

(10) Patent No.: US 8,768,957 B2
(45) Date of Patent: *Jul. 1, 2014

(54) CONSOLIDATING RELATED TASK DATA IN PROCESS MANAGEMENT SOLUTIONS

(75) Inventors: Laura M. Chan, Markham (CA); Roke Jung, Markham (CA); Dipali Kapadia, Markham (CA); Tinny M. Ng, Markham (CA); Neil R. Santos, Markham (CA); Kaylee M. Thomsen, Durham, NC (US); Kim Tsao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/873,543

(22) Filed: Sep. 1, 2010

(65) Prior Publication Data

US 2011/0066647 A1 Mar. 17, 2011

(30) Foreign Application Priority Data

Sep. 17, 2009 (CA) ...................................... 2679494

(51) Int. Cl.
*G06F 17/30* (2006.01)
(52) U.S. Cl.
USPC ........................................................ 707/770
(58) Field of Classification Search
USPC ................................................ 707/792, 770
See application file for complete search history.

(56) References Cited

U.S. PATENT DOCUMENTS

| | | | | |
|---|---|---|---|---|
| 7,996,855 B2 * | 8/2011 | Heist et al. | ..................... | 719/330 |
| 8,131,666 B2 * | 3/2012 | O'Brien et al. | ................ | 707/608 |
| 8,606,804 B2 * | 12/2013 | Merz et al. | ..................... | 707/759 |
| 2006/0031377 A1 * | 2/2006 | Ng et al. | ........................ | 709/208 |
| 2006/0106774 A1 * | 5/2006 | Cohen et al. | ..................... | 707/3 |
| 2006/0242582 A1 * | 10/2006 | Swanson et al. | .............. | 715/733 |
| 2007/0266054 A1 * | 11/2007 | Stephens et al. | .............. | 707/200 |
| 2008/0040672 A1 * | 2/2008 | Appleyard et al. | ........... | 715/742 |
| 2008/0086527 A1 * | 4/2008 | Sposetti et al. | ............... | 709/204 |
| 2008/0154690 A1 * | 6/2008 | Mommeja | .......................... | 705/9 |
| 2010/0274620 A1 * | 10/2010 | Upadhyaya et al. | .............. | 705/9 |

FOREIGN PATENT DOCUMENTS

CA 2501114 A1 10/2003

OTHER PUBLICATIONS

"Oracle Portals and Self-Service Applications", Oracle Data Sheet, Oracle Consulting, 2007, pp. 1-4.
Office action dated Aug. 23, 2012 regarding U.S. Appl. No. 13/439,008, 15 pages.

(Continued)

*Primary Examiner* — Rehana Perveen
*Assistant Examiner* — Scott A Waldron
(74) *Attorney, Agent, or Firm* — Yee & Associates, P.C.; David A. Mims, Jr.

(57) ABSTRACT

A computer program product and apparatus are disclosed for managing task data. A task identifier that identifies a task is sent from a task processing portlet to a mapping engine, and then to a process server. A task type is identified by the process server based on the task identifier. The task type is sent from the process server to the mapping engine, which uses a mapping entry database that includes mapping entries to identify a set of queries and a set of data sources that are mapped to the task type. Data received from the set of data sources is aggregated in response to the set of queries to form aggregated data. The aggregated data is used by the human user to complete the selected task. The mapping entry is changed at runtime by changing the set of data sources that are mapped to the task type.

17 Claims, 6 Drawing Sheets

(56) References Cited

OTHER PUBLICATIONS

CA office action dated Sep. 12, 2012 regarding application CA2679494, 3 pages.
JACSO, "Internet Insights—Thoughts about Federated Searching," Information Today, vol. 21, No. 9, Oct. 2004, p. 17, accessed Nov. 16, 2012, 22 pages http://www2.hawaii.edu/~jacso/extra/federated/federated.htm.
Linoski et al., "Federated Search 101," Library Journal, Jul. 2008, 8 pages, accessed Nov. 16, 2012 http://www.libraryjournal.com/lj/ljinprintnetconnect/888214-335/alexis_linoski_and_tine_walczyk.html.csp.

Notice of Allowance, dated Dec. 5, 2012, regarding U.S. Appl. No. 13/439,008, 5 pages.

* cited by examiner

CONSOLIDATING RELATED TASK DATA IN PROCESS MANAGEMENT SOLUTIONS

BACKGROUND

1. Field

The present invention relates generally to an improved data processing system and in particular to a method and apparatus for process management. More particularly, the present invention is directed towards providing a computer implemented method, apparatus, and computer usable program code for consolidating task related data from a plurality of data sources in a business process management solution.

2. Description of the Related Art

Human tasks frequently play a valuable role in business processes. They allow humans to carry out tasks that may not be suitable for automation. As a process is performed, tasks that are to be performed by a human may be assigned to one or more users. As these tasks become more advanced and more complex, the users performing the tasks may require different types of information from a variety of different data sources prior to completion of the tasks.

Currently, when a process involves human performed tasks that require data from multiple external data sources, a user typically logs onto each of the various data sources and manually obtains the relevant data, assesses the data, and then makes the decision or otherwise completes the task. However, the process of obtaining data manually from multiple different data sources may be inefficient and burdensome. In addition, the user may not have the knowledge required to locate and access the various data sources, identify desirable data, and retrieve the data. In other words, if an entity has many processes that require human actions, a user may have difficulty remembering where and how to retrieve all of the relevant data from the various data sources for each different human task in each process.

SUMMARY

According to one embodiment of the present invention, a computer implemented method, apparatus, and computer program product for managing task data is provided. A task advisor identifies a set of queries and a set of data sources mapped to a task type in a mapping entry. The task type is associated with a selected task. The mapping entry maps the task type to the set of queries. The set of queries is mapped to the set of data sources. The task advisor sends each query in the set of queries to a corresponding data source in the set of data sources. The task advisor aggregates the data received from the set of data sources in response to the set of queries. A user utilizes the aggregated data to complete the selected task.

In yet another embodiment, a computer implemented method, apparatus, and computer program product for a task advisor is presented. A task advisor receives an updated mapping entry for a task type in a mapping entries database. The task type corresponds to a set of tasks. The updated mapping entry comprises an updated set of queries. The set of queries is mapped to a set of data sources. In response to receiving a user selection of a task associated with the task type, the task advisor transmits the updated set of queries mapped to the task type and the set of data sources mapped to the set of queries in the mapping entry to a query engine. The query engine queries each data source in the set of data sources for data associated with the selected task. The task advisor aggregates data received from the set of data sources in response to the queries for presentation to the user in a single task details portlet.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
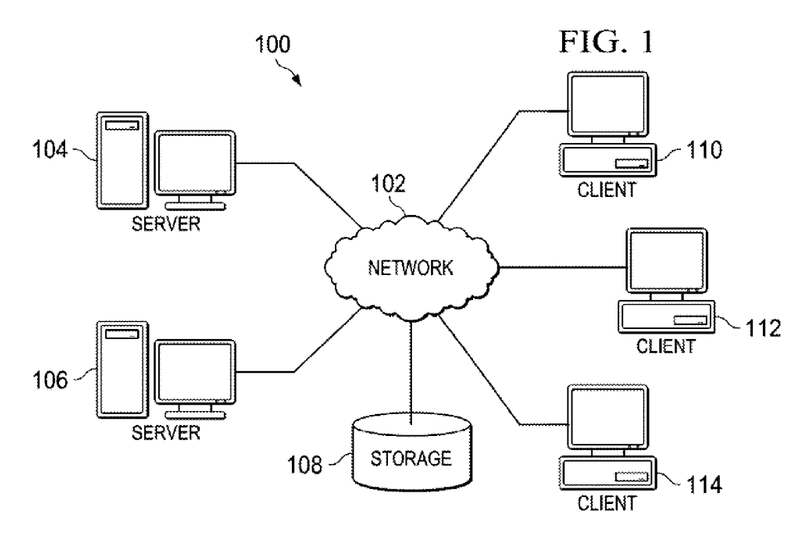
FIG. 1 is a pictorial representation of a network of data processing systems in which illustrative embodiments may be implemented.
Figure 2:
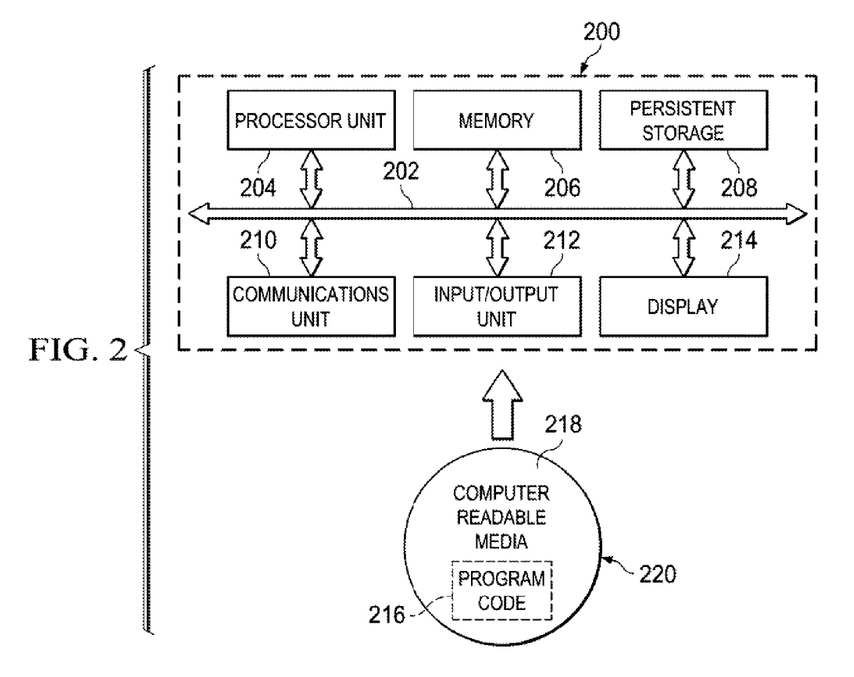
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204. The computer readable program code may be embodied on different physical or tangible computer readable media, such as memory 206 or persistent storage 208.

Computer usable program code 216 is located in a functional form on computer readable media 218 and may be loaded onto or transferred to data processing system 200. Computer usable program code 216 and computer readable media 218 comprise computer program product 220 in these examples. In one example, computer readable media 218 may be, for example, an optical or magnetic disc that is inserted or placed into a drive or other device that is part of persistent storage 208 for transfer onto a storage device, such as a hard drive that is part of persistent storage 208. Computer readable media 218 also may take the form of a persistent storage, such as a hard drive or a flash memory that is connected to data processing system 200.

Alternatively, computer usable program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the computer readable program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The embodiments recognize that a user, company, organization, or other entity may have multiple different processes defined. A process may be, without limitation, a business process, a manufacturing process, an assembly process, an administrative process, or any other set of tasks associated with a given goal or result. For example, and without limitation, a process may be a promotion process, a salary compensation process, an inventory restocking process, a hiring process, an evaluation process, a marketing process, or any other type of process.

Some of the tasks in a given process may be entirely automated, but other tasks may require a human to perform the task either in whole or in part. Each task performed in whole or in part by a human may likewise require that supporting data from a variety of different data sources be located, obtained, and provided for the human to complete the task. In other words, every task within each process that is performed by a human may require different sets of supporting data from multiple external data sources for the task owner to make a decision and/or complete the task.

For example, and without limitation, a promotion process for approving a promotion application may include completion of a human approval task. The approval task may include retrieval of an individual's business commitments (PBC) rating from a PBC database, work performance history (WPH) from a human resources (HR) database, and individual career development plan (IDP) from a career information database. These three different external documents reside in three different external database data sources. However, a currently available task details portlet only has the ability to interface with one of the three data sources. In addition, the queries that are used to retrieve the PBC, WPH, and IDP information are different. However, a task details portlet can only support one statically configured query. These limitations would likely result in the human manager performing the task, manually locating and retrieving each respective document so that the manager can approve or reject the promotion application.

In yet another example, a salary compensation process that is used by a manager to approve a salary increase may involve a human performed approval task. The approval task may require data such as, without limitation, a PBC rating from the PBC database, a department compensation budget from a financial database, and the current market's salary average from the HR database. Again, the embodiments recognize that a currently available task details portlet would be unable to retrieve the data from all three different data sources and provide the relevant data to the manager in a single portlet. The embodiments recognize that the manual retrieval of documents in these processes is time consuming and inefficient for users.

In one solution, a developer may create a task details portlet for each data source. A user selects a task details button or icon for a particular task from the task source. In response, details pertaining to the task are presented to the user. However, each task details portlet is restricted to communicating with one endpoint only. The location of this endpoint is not configurable at runtime. The embodiments recognize that this limitation makes it very difficult to consume the task details portlet in a service oriented architecture (SOA) design. In addition, every request for details on a particular task results in the same query because the query is hardcoded at development time. In other words, the query used to retrieve data from a particular data source is hardcoded by a developer. This results in a data retrieval process that cannot be reconfigured at runtime.

The embodiments also recognize that current methods of providing a user with all the details required to complete a task in a process may be inefficient, inaccurate, and/or leave a user unable to retrieve all of the pertinent data for completing the task. Therefore, the illustrative embodiments provide a computer implemented method, apparatus, and computer program product for managing task data. A task advisor identifies a set of queries and a set of data sources mapped to a task type in a mapping entry. As used herein, the term set refers to two or more items, unless otherwise specified. Thus, the set of queries is a set of two or more queries Likewise, the set of data sources is a set of two or more data sources.

The task type is associated with a selected task. A task type may be associated with a single task or with two or more tasks. For example, an approval task type may only be associated with a compensation approval task. In another example, the approval task type may be associated with a hiring approval task, the compensation approval task, and the promotion approval task. The mapping entry maps the task type to the set of queries and the set of data sources. The task advisor sends each query in the set of queries to a corresponding data source in the set of data sources. The task advisor aggregates the data received from the set of data sources in response to the set of queries. A user utilizes the aggregated data to perform the selected task.

Figure 3:
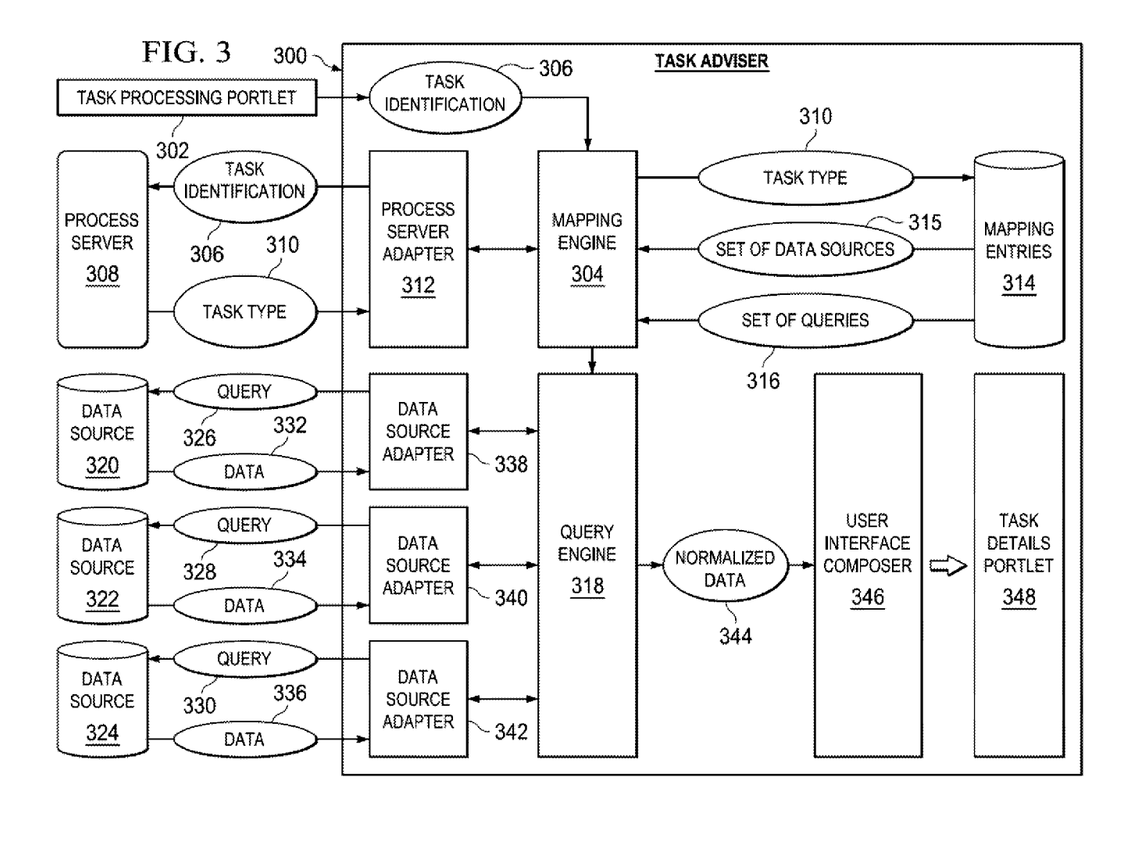
FIG. 3 is a block diagram of a task advisor in accordance with an illustrative embodiment.

FIG. 3 is a block diagram of a task advisor in accordance with an illustrative embodiment. Human task advisor 300 is a software application that obtains target data from a plurality of data sources associated with a selected task and aggregates that data for display to a user. In this embodiment, human task advisor 300 is an application that is plugged into any web portal to display supporting data for human task processing. However, task advisor 300 is not required to be pluggable. In another embodiment, human task advisor 300 may be incorporated directly into a data processing system, rather than being implemented as a pluggable application.

When a user selects a task for processing, task processing portlet 302 identifies the appropriate task identification (ID) 306 for the selected task. Task identification 306 is a key or identifier associated with the selected task. Each task associated with task advisor 300 has a unique task ID. Task identification 306 may be meta-data or actual data, such as, but without limitation, business data. Task processing portlet 302 is a task source, such as, but without limitation, a task list or a task processing portlet, such as a portlet associated with a web portal. Task processing portlet 302 obtains the task ID from the portal's property broker. In another embodiment, task processing portlet 302 may obtain task identification 306 for a selected task from any source capable of providing the task ID. For example, task processing portlet 302 may retrieve task identification 306 from a database of task identifiers or receive a task identifier that is selected manually by the user.

Task processing portlet 302 sends task identification 306 for the selected task to mapping engine 304 in task advisor 300. Mapping engine 304 is a software component that identifies a set of data sources having data that is needed by a user to complete the selected task using the task identifier. Mapping engine 304 receives task identification 306 for the selected task and sends task identification 306 to process server 308 via process server adapter 312. Process server 308 may be implemented as any type of process server, such as, but without limitation, an IBM® Websphere® process server (IBM and Websphere are trademarks or registered trademarks of International Business Machines Corporation). Process server adapter 312 may be implemented using any type of adapter to enable communications between task advisor 300 and process server 308, such as, but without limitation, an application adapter. Process server 308 identifies task type 310 corresponding to task identification 306, and transmits task type 310 to mapping engine 304 via process server adapter 312.

Mapping engine 304 receives task type 310 from process server 308 via process server adapter 312. Mapping engine 304 sends task type 310 to mapping entries 314. Mapping entries 314 is a database that maps task types with sets of data sources and sets of queries corresponding to those sets of data sources. In this example, mapping entries 314 contains a set of task types that includes task type 310.

Each task type in the set of task types is mapped to a set of queries, such as set of queries 316. The task type is associated with a set of queries that may be used to obtain pertinent data from the set of data sources. Each set of queries is mapped to a set of data sources, such as data sources 315. In other words, mapping entries 314 contains mapping entries that associate data sources to different queries for each task type.

In this example, task type 310 is mapped to set of queries 316. Set of queries 316 is mapped to set of data sources 315. Thus, when mapping entries 314 of task advisor 300 receives task type 310 from mapping engine 304, mapping entries 314 sends set of data sources 315 and set of queries 316 associated with task type 310 to mapping engine 304. Mapping engine 304 then sends set of data sources 315 and set of queries 316 to query engine 318.

Query engine 318 is a software component that transmits a query from set of queries 316 to each data source in set of data sources 315 via a set of data source adapters. In this example, set of data sources 315 associated with task type 310 comprises data source 320, data source 322, and data source 324. However, the embodiments are not limited to three data sources. Set of data sources 315 may include any number of data sources, such as two data sources, three data sources, as well as four or more data sources. Set of data sources 315 may be local data sources and/or remote/external data sources. The data sources in set of data sources 315 may be located in one or more remote locations, such as, but without limitation, a remote server and/or a remote database.

Query engine 318 sends a query from set of queries 316 to each data source in set of data sources 315. In this example, query engine 318 sends query 326 to data source 320, query 328 to data source 322, and query 330 to data source 324. Set of queries 316 may include any number of queries corresponding to set of data sources 315, such as, but without limitation, a single query, two queries, three queries, as well as four or more queries. Query engine 318 receives data responsive to set of queries 316 from set of data sources 315. In this example, query engine 318 receives data 332 from data source 320, data 334 from data source 322, and data 336 from data source 324.

Query engine 318 communicates with set of data sources 315 via a set of data source adapters. In this example, the set of data source adapters comprises data source adapter 338-342. In this embodiment, query engine 318 communicates with each data source using a different data source adapter. However, in another embodiment, query engine 318 may communicate with two or more data sources using a single data source adapter.

Query engine 318 receives data 332-336 from set of data sources 315. Query engine 318 aggregates the relevant data received in response to set of queries 316, such as data 332-336. As used herein, the term relevant data or target data refers to data that is responsive to a query. Query engine 318 transforms the aggregated query results, which includes responsive data 332-336 received from set of data sources 315, into normalized data 344. Normalized data 344 is the aggregated query results transformed into a neutral common data format.

Query engine 318 sends normalized data 344 to user interface composer 346. User interface composer 346 generates a user interface that includes normalized data 344. In this example, the common data format transformed by query engine 318 and user interface composer 346 is used to create a single portlet for different kinds of task supporting data.

User interface composer 346 sends the generated user interface that includes normalized data 344 to task details portlet 348. Task details portlet 348 is a web portlet that displays normalized data 344 in the generated user interface to a user via an output device. The output device may be implemented using any type of output device, such as, but without limitation, a monitor, a projector, a touch screen, a printer, an audio device, or any other device for outputting data to a user. Normalized data 344 is displayed using only one portlet, the task details portlet 348.

Task details portlet 348 is configured to react to the task IDs exposed by the task source, such as, task processing portlet 302. Task details portlet 348 has the ability to dynamically add endpoints and queries, map a query to an endpoint, and map each task type in a process to one or many queries. All configuration information is self-contained within task details portlet 348 and is fully configurable. A user can configure task details portlet to communicate with multiple endpoints which together may provide more details about the selected task than the task detail portlets in the prior art.

Figure 4:
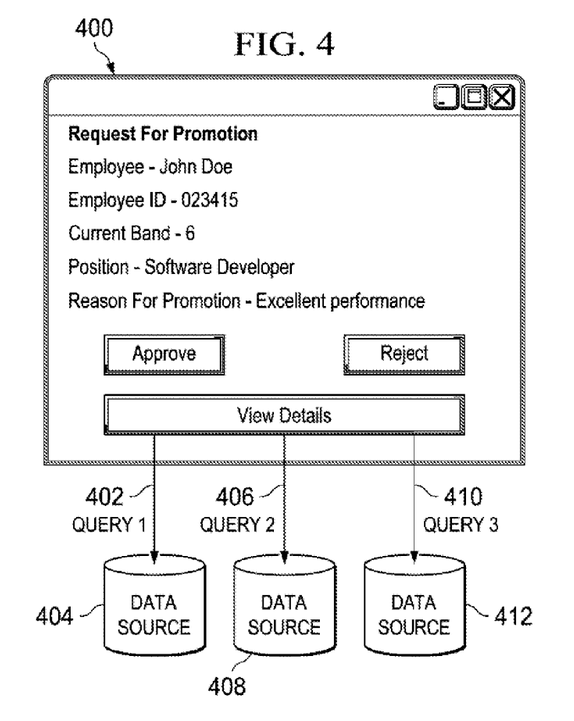
FIG. 4 is a block diagram of a task selection in accordance with an illustrative embodiment.

FIG. 4 is a block diagram of a task selection in accordance with an illustrative embodiment. Here, task selection interface 400 is an interface display associated with a task for approving a promotion request. When a user selects an option to view data associated with the selected task of approving a promotion request, a task advisor application, such as task advisor 300 in FIG. 3, identifies a task type for the selected task. The task advisor retrieves a set of data sources and a set of queries for the task type from a mapping entries database, and sends the set of queries to the set of data sources. In this example, the task advisor sends query 1 402 to data source 404, query 2 406 to data source 408, and sends query 3 410 to data source 412. Each data source responds to the queries by sending the appropriate responsive data back to the task advisor for display to the user.

In this example, a task advisor sends query 402 to obtain data from data source 404 for a promotion evaluation task. However, the task advisor may also send query 402 to obtain data from data source 404 for one or more other tasks. In other words, if data from data source 404 may also be used in a task for transferring an individual or hiring an individual, in addition to evaluating someone for promotion, the same query 402 may also be sent to data source 404 in response to a user selecting the transfer approval task or the hiring approval task.

Task selection interface 400 is an exemplary user interface display associated with a task details portlet, such as task details portlet 348 in FIG. 3. Task selection interface 400 is only one example of a possible user interface for task selection. The embodiments are not limited to the appearance, configuration, icons, format, fonts, or layout of the user interface shown in FIG. 4. Any input/output interface that is now or may become available may be utilized in accordance with the embodiments to obtain task selections and selection to view task data obtained from data sources.

Figure 5:
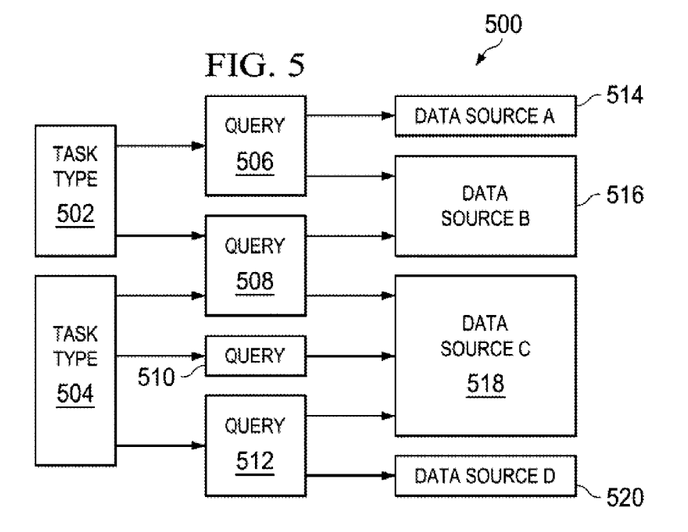
FIG. 5 is a block diagram of mapping entries in accordance with an illustrative embodiment.

FIG. 5 is a block diagram of mapping entries in accordance with an illustrative embodiment. Mapping entries 500 is a software component for mapping task types to sets of data sources and sets of queries for those data sources, such as mapping entries 314 in FIG. 3. Mapping entries 500 comprises a set of one or more task type to data source mapping entries. Each task type to data source mapping entry maps a task type to a set of queries. The set of queries is mapped to a set of data sources.

Mapping entries 500 may map a query to one or more different task types, such as, but without limitation, task type 502 and task type 504. In this example, task type 502 is mapped to query 506 and query 508. Task type 504 is mapped to query 508, query 510, and query 512. In this example, query 508 is mapped to both task type 502 and task type 504. In other words, a query, such as query 508, may be mapped to multiple different task types. In this example, query 508 is mapped to two different task types. However, a query may be mapped to only a single task type, two task types, as well as three or more task types.

A query may be mapped to one or more data sources. The query may be sent to mapped data sources to obtain desired information from that data source. In this example, without limitation, query 506 is mapped to data source A 514 or data source B 516. Therefore, query 506 may be sent to data source A 514 or data source B 516 to obtain data for utilization in completing the task associated with task type 502. Likewise, query 508 is mapped to data source B 516 and data source C 518. Thus, query 506 and query 508 are queries in a set of queries that may be sent to data source B 516. Data source A 514 and data source B 516 are data sources in a set of data sources mapped to task type 502. Query 510 is mapped to a single data source, data source C 518. Query 512 is mapped to data source C 518 and data source D 520. A query may be mapped to a single data source, two data sources, as well as three or more data sources. Thus, mapping entries 500 may map a single data source to a single task type, as well as being mapped to two or more task types. Multiple different task types may also share a single, common query.

Moreover, a user can add, delete, or change any task type to data source mapping entry in mapping entries 500 at anytime. The task type to data source mapping entries are not statically bounded to the application. When additional supporting data is available for a user to perform a task associated with a particular task type, a user can create a new data type to data source mapping entry to query for the additional supporting data in mapping entries 500. In this manner, the mapping engine in a task advisor is able to pick up the latest task data settings dynamically as data sources and data queries for those data sources are added, updated, deleted, or modified. In other words, the mapping between a task and a query is fully configurable by a user without re-deploying the task advisor application. Thus, mapping entries 500 provides a user with the ability to specify queries at runtime, map each query to an endpoint at runtime, and specify which queries are associated with each task type at runtime.

Figure 6:
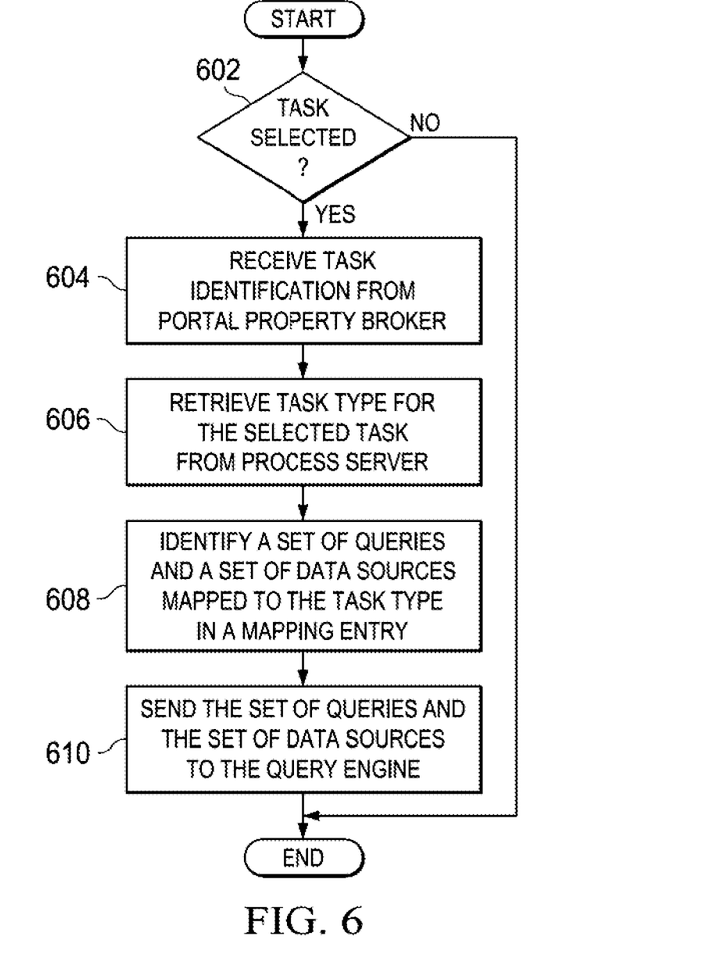
FIG. 6 is a flowchart of a process for retrieving a set of queries for a set of data sources associated with a selected task in accordance with an illustrative embodiment.

FIG. 6 is a flowchart of a process for retrieving a set of queries for a set of data sources associated with a selected task in accordance with an illustrative embodiment. The process in FIG. 6 may be implemented by a software component for obtaining queries for data sources associated with a task identifier, such as mapping engine 304 in FIG. 3.

The process begins by making a determination as to whether a task is selected (step 602). If no, the process terminates thereafter. If a task is selected at step 602, the mapping engine receives a task identifier from a portal property broker (step 604). The mapping engine retrieves a task type for the selected task from a process server (step 606). The task type corresponds to the task identifier. The mapping engine identifies a set of queries and a set of data sources mapped to the task type in a mapping entry (step 608). The mapping engine sends the set of queries and the set of data sources to the query engine (step 610), with the process terminating thereafter.

Figure 7:
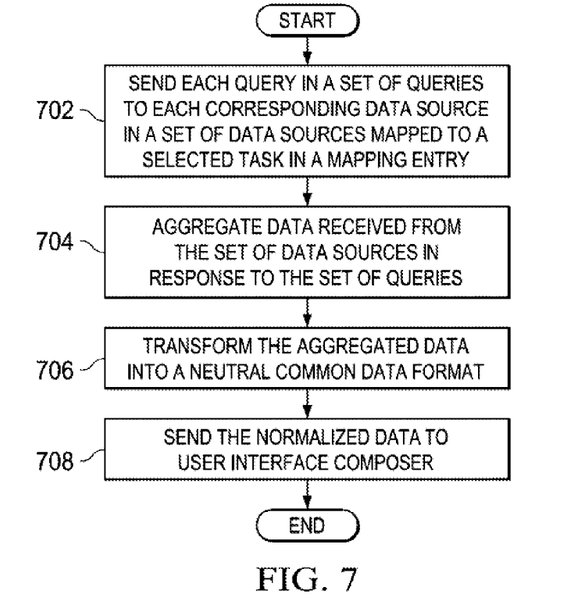
FIG. 7 is a flowchart of a process for consolidating task data associated with a selected task in accordance with an illustrative embodiment.

FIG. 7 is a flowchart of a process for consolidating task data associated with a selected task in accordance with an illustrative embodiment. The process in FIG. 7 may be implemented by a software component for querying data sources and consolidating task data received from a set of data sources, such as query engine 318 in FIG. 3.

The process begins by sending each query in a set of queries to each corresponding data source in a set of data sources mapped to a selected task in a mapping entry (step 702). The process aggregates the data received from the set of data sources in response to the set of queries (step 704). The process transforms the aggregated data into a neutral common data format (step 706). The data in the neutral common data format is normalized data that can be displayed to a user on a display device, such as, but without limitation, a monitor. The process sends the normalized data in the neutral common data format to a user interface composer (step 708) for display to the user, with the process terminating thereafter.

Figure 8:
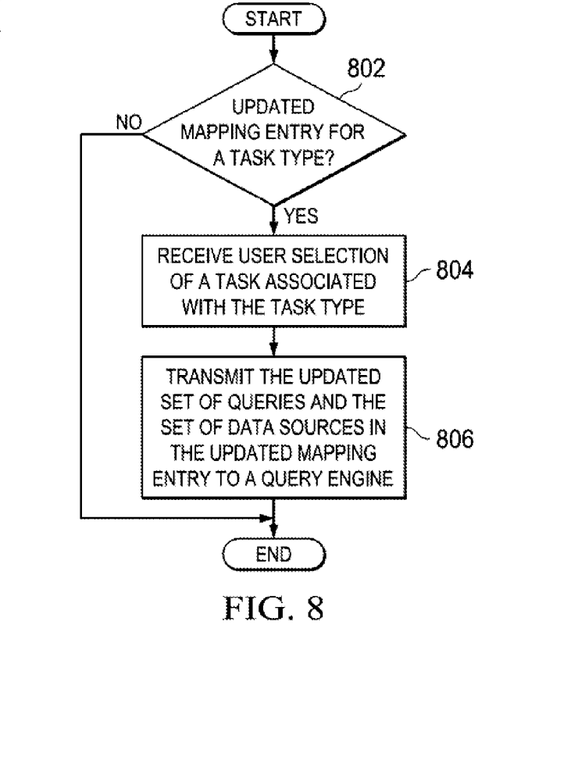
FIG. 8 is a flowchart of a process for updating a mapping entry in accordance with an illustrative embodiment.

FIG. 8 is a flowchart of a process for updating a mapping entry in accordance with an illustrative embodiment. The process in FIG. 8 may be implemented by a software component for generating task data for a human task from a set of data sources, such as task advisor 300 in FIG. 3.

The process begins by making a determination as to whether an updated mapping entry for a task type is received (step 802). The updated mapping entry includes an updated set of queries that is mapped to a set of data sources. If no, then the process terminates thereafter. If an updated mapping entry for a task type is received, the process receives a user selection of the task associated with the task type (step 804). The process then transmits the updated set of queries and the set of data sources in the updated mapping entry to a query engine (step 806), with the process terminating thereafter.

In one embodiment, the query engine queries each data source in the set of data sources for data associated with the selected task using the set of queries. The task advisor then aggregates the data received from the set of data sources in response to the queries for presentation to the user in a single task details portlet.

Thus, when a user adds a new data source for a given task or set of tasks to the task advisor, the task advisor dynamically adds a new query for that data source. The task advisor application can access the new data source and obtain needed data from the new data source dynamically. A developer is not required to hard code a task detail portlet and hard code the query for the new data source. The task advisor is not re-deployed or modified when a new data source and/or a new set of queries are added.

Figure 9:
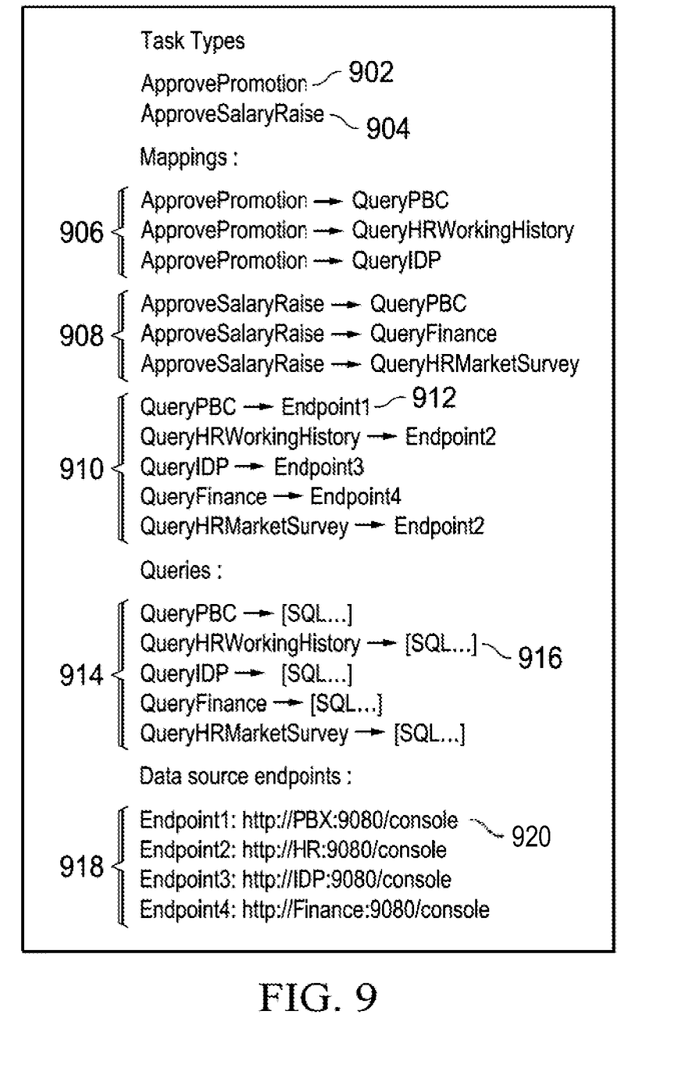
FIG. 9 is an example of pseudo-code for consolidating task data from a set of data sources in accordance with an illustrative embodiment.

FIG. 9 is pseudo-code for consolidating task data from a set of data sources in accordance with an illustrative embodiment. Line of code 902 specifies a task type for a promotion approval task that is referred to as "ApprovePromotion". Line of code 904 specifies a task type for a salary raise approval task that is referred to as "ApproveSalaryRaise". Code 906 is code for mapping the "ApprovePromotion" task type to a set of various queries, such as a query to the PBC data source, the human resources WPH data source, and the IDP data source.

Code 908 is code for mapping the task "ApproveSalaryRaise" to a set of queries for retrieving data pertinent to that task. In this example, the set of queries are directed to the PBC database, a finance information database, and a human resources market survey information database. Code 910 maps each query in code 906-908 with a different endpoint. For example, line of code 912 maps the query to the PBC database to a data source identified as endpoint 1.

Code 914 is a set of queries. In this example, each query is written in the standard query language (SQL) for accessing and manipulating information in a database. For example, line of code 916 is code for a query to the human resources WPH database requesting work history information for a particular individual from that database. Code 918 is a set of endpoint addresses. For example, line of code 920 is a hypertext transfer protocol (HTTP) address for the PBX database.

Thus, code 906-908 maps each task type to a set of queries. Code 910 identifies the endpoint for each query, and code 914 provides the query language. Code 918 is then used to access each data source. The task advisor then transmits the appropriate query to each data source for a given task type.

The code in FIG. 9 is only an example of one implementation of code for the task advisor application. The code in FIG. 9 is not intended as a limitation. The embodiments may be implemented using different code than that shown in FIG. 9.

Thus, the embodiments provide a computer implemented method, apparatus, and computer program product for managing task data. A task advisor identifies a set of queries and a set of data sources mapped to a task type in a mapping entry. The task type is associated with a selected task. The mapping entry maps the task type to the set of queries and the set of data sources. The task advisor sends each query in the set of queries to a corresponding data source in the set of data sources. The task advisor aggregates the data received from the set of data sources in response to the set of queries. A user utilizes the aggregated data to perform the selected task.

In this manner, the task adviser provides a consolidated task details portlet that provides all configured information for completion of a task by a user within a self-contained portlet that is fully configurable at runtime. An administrator or other user can configure the task details portlet to communicate with multiple endpoints to retrieve data from multiple different data sources and provide more details about the task to the user performing the task. When a new data source is added, a new query can be added and the task advisor can obtain data from the new data source dynamically. A developer is not required to develop a new task detail portlet and hard code a new query for the new data source. Likewise, the task advisor does not have to be re-deployed to recognize and utilize the new data source.

Thus, the illustrative embodiments provide a pluggable human task advisor that is deployed into a web portal and configured to add or remove data sources. The human task advisor eliminates the need to have multiple task detail portlets and reduces the amount of development effort required to obtain task details for a particular task. The task advisor utilizes queries and data sources to fetch supporting data for various human tasks, and is configured by an administrator using a user-friendly user-interface.

The task advisor application is flexible enough to perform different queries on different sets of data sources for each different task type, aggregate the data, and display the data to the user in a single task detail portlet. This single task detail portlet is used to display all of the gather, aggregate, and display data for all types of human tasks and all types of query data. The human task advisor application can access the new data source and obtain needed data from the new data source dynamically. A developer is not required to hard code a task detail portlet and hard code the query for the new data source. The human task advisor is not re-deployed or modified when a new data source and/or a new set of queries are added. The same query is shared for different tasks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus, such as a communications fabric. The memory elements can include local memory utilized during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for managing task data, the computer program product comprising:
   a non-transitory computer usable storage medium having computer usable program code recorded therewith, the computer usable program code comprising:
   computer usable program code configured to send, from a task processing portlet to a mapping engine, a task identifier that identifies a task, wherein the task processing portlet obtained the task identifier from a database of task identifiers, wherein the task identifier is sent in response to a user selection of the task, and wherein the selected task is to be performed by a human user;
   computer usable program code configured to send, from the mapping engine to a process server, the task identifier;
   computer usable program code configured to identify, by the process server, a task type based on the task identifier;
   computer usable program code configured to send, from the process server to the mapping engine, the task type;
   computer usable program code configured to identify, by the mapping engine using a mapping entry database that includes a plurality of mapping entries, a set of queries and a set of data sources that are mapped to the task type using one of the plurality of mapping entries, wherein the task type is associated with the selected task;
   computer usable program code configured to send each query in the set of queries to a corresponding data source in the set of data sources;
   computer usable program code configured to aggregate data received from the set of data sources in response to the set of queries to form aggregated data, wherein the aggregated data is used by the human user to complete the selected task; and computer usable program code configured to change the one of the plurality of mapping entries at runtime by changing the set of data sources that are mapped to the task type at runtime.

2. The computer program product of claim 1 further comprising:
computer usable program code configured to transform the aggregated data into a neutral common data format to form normalized data; and
computer usable program code configured to send the normalized data to a user interface composer for presentation to the user.

3. The computer program product of claim 1 further comprising:
computer usable program code configured to present the aggregated data to the user on a display device, by a single task details portlet, wherein the task details portlet presents data from the set of data sources associated with the selected task to the user.

4. The computer program product of claim 1 further comprising:
computer usable program code configured to map an updated query and an existing data source in the set of data sources to the task type in the one of the plurality of mapping entries in response to receiving an updated query for an existing data source in the set of data sources.

5. The computer program product of claim 1, wherein a first query in the set of queries is mapped to a first set of data sources and wherein a second query in the set of queries is mapped to a second set of data sources.

6. A computer program product for a task advisor, the computer program product comprising:
a non-transitory computer usable storage medium having computer usable program code recorded therewith, the computer usable program code comprising:
computer usable program code configured to update a mapping entry at runtime to form an updated mapping entry for a task type in a mapping entries database, wherein the task type corresponds to a set of tasks, wherein a set of data sources that are mapped to the task type using the mapping entry are changed at runtime when the mapping entry is updated, wherein the updated mapping entry comprises an updated set of queries, wherein the set of queries is mapped to a changed set of data sources, wherein the task type is identified by a process server based on a task identifier that identifies a task, wherein the task identifier is sent in response to a user selection of the task, and wherein a task processing portlet obtained the task identifier from a database of task identifiers;
computer usable program code configured to transmit the updated set of queries mapped to the task type and the changed set of data sources mapped to the set of queries in the updated mapping entry to a query engine in response to receiving the user selection of the task, wherein the selected task is to be performed by a human user, wherein the query engine queries each data source in the updated set of data sources for data associated with the selected task, and wherein the task advisor aggregates data received from the updated set of data sources in response to the queries for presentation to the human user in a single task details portlet, and wherein the aggregated data is used by the human user to complete the selected task.

7. The computer program product of claim 6 further comprising:
computer usable program code configured to map the new query and the new data source to the task type in the updated mapping entry in response to receiving a new query for a new data source.

8. The computer program product of claim 6 further comprising:
computer usable program code configured to map the updated query and the existing data source in the set of data sources to the task type in the updated mapping entry in response to receiving an updated query for an existing data source in the set of data sources.

9. The computer program product of claim 6 further comprising:
computer usable program code configured to present the aggregated data to the human user on a display device, by the task details portlet, wherein the task details portlet presents data from the set of data sources associated with the selected task to the human user.

10. The computer program product of claim 6, wherein a first query in the set of queries is mapped to a first set of data sources and wherein a second query in the set of queries is mapped to a second set of data sources.

11. An apparatus comprising:
a bus system;
a communications system coupled to the bus system;
a memory connected to the bus system, wherein the memory includes computer usable program code; and
a processing unit coupled to the bus system, wherein the processing unit comprises a processor and executes the computer usable program code to send, from a task processing portlet to a mapping engine, a task identifier that identifies a task, wherein the task processing portlet obtained the task identifier from a database of task identifiers, wherein the task identifier is sent in response to a user selection of the task, and wherein the selected task is to be performed by a human user; send, from the mapping engine to a process server, the task identifier; identify, by the process server, a task type based on the task identifier; send, from the process server to the mapping engine, the task type; identify, by the mapping engine using a mapping entry database that includes a plurality of mapping entries, a set of queries and a set of data sources that are mapped to the task type using one of the plurality of mapping entries, wherein the task type is associated with the selected task; send each query in the set of queries to a corresponding data source in the set of data sources; aggregate data received from the set of data sources in response to the set of queries to form aggregated data, wherein the aggregated data is used by the human user to complete the selected task; and change the one of the plurality of mapping entries at runtime by changing the set of data sources that are mapped to the task type at runtime.

12. The computer program product of claim 1 wherein the selected task is a salary increase approval task, wherein a first query of the set of queries retrieves an individual's business commitments rating, wherein a first data source of the set of data sources is a business commitments rating database, wherein a second query of the set of queries retrieves a department compensation budget, wherein a second data source of the set of data sources is a financial database, wherein a third query of the set of queries retrieves a current market's salary average, and wherein a third data source of the set of data sources is a human resources database.

13. The computer program product of claim 1 wherein the selected task is a promotion application approval task, wherein a first query of the set of queries retrieves an individual's business commitments rating, wherein a first data source of the set of data sources is a business commitments rating database, wherein a second query of the set of queries retrieves a work performance history, wherein a second data source of the set of data sources is a human resources database, wherein a third query of the set of queries retrieves an individual career development plan, and wherein a third data source of the set of data sources is a career information database.

14. The computer program product of claim 6 wherein the selected task is a salary increase approval task, wherein a first query of the set of queries retrieves an individual's business commitments rating, wherein a first data source of the set of data sources is a business commitments rating database, wherein a second query of the set of queries retrieves a department compensation budget, wherein a second data source of the set of data sources is a financial database, wherein a third query of the set of queries retrieves a current market's salary average, and wherein a third data source of the set of data sources is a human resources database.

15. The computer program product of claim 6 wherein the selected task is a promotion application approval task, wherein a first query of the set of queries retrieves an individual's business commitments rating, wherein a first data source of the set of data sources is a business commitments rating database, wherein a second query of the set of queries retrieves a work performance history, wherein a second data source of the set of data sources is a human resources database, wherein a third query of the set of queries retrieves an individual career development plan, and wherein a third data source of the set of data sources is a career information database.

16. The computer program product of claim 1 wherein the task type is associated with a hiring approval task, a compensation approval task, and a promotion approval task.

17. The computer program product of claim 6 wherein the task type is associated with a hiring approval task, a compensation approval task, and a promotion approval task.

* * * * *